United States Patent
Huang et al.

(10) Patent No.: US 9,391,859 B2
(45) Date of Patent: Jul. 12, 2016

(54) SERVICE COORDINATION FOR A DATA CENTER

(71) Applicant: Hangzhou H3C Technologies Co., Ltd., Hangzhou (CN)

(72) Inventors: Fengxian Huang, Beijing (CN); Songer Sun, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 14/769,310

(22) PCT Filed: Feb. 26, 2014

(86) PCT No.: PCT/CN2014/072538
§ 371 (c)(1),
(2) Date: Aug. 20, 2015

(87) PCT Pub. No.: WO2014/131347
PCT Pub. Date: Sep. 4, 2014

(65) Prior Publication Data
US 2015/0381447 A1 Dec. 31, 2015

(30) Foreign Application Priority Data

Feb. 28, 2013 (CN) .......................... 2013 1 0063711

(51) Int. Cl.
*G06F 15/173* (2006.01)
*H04L 12/26* (2006.01)
(Continued)

(52) U.S. Cl.
CPC .......... *H04L 43/0817* (2013.01); *H04L 45/026* (2013.01); *H04L 61/1511* (2013.01); *H04L 67/1004* (2013.01); *H04L 69/40* (2013.01)

(58) Field of Classification Search
CPC ............ H04L 43/0817; H04L 61/1511; H04L 67/1004; H04L 45/026; H04L 69/40; H04L 12/26; H04L 29/08; H04L 12/751; H04L 29/12
See application file for complete search history.

(56) References Cited

U.S. PATENT DOCUMENTS 7,103,651 B2 * 9/2006 Bohannon ............... H04L 29/06 709/223
7,756,965 B2 * 7/2010 Joshi .................. H04L 29/12792 709/217

(Continued)

FOREIGN PATENT DOCUMENTS

| CN | 1529460 | 9/2004 |
|---|---|---|
| CN | 101325552 | 12/2008 |
| CN | 102710780 | 10/2012 |

OTHER PUBLICATIONS

International Search Report and Written Opinion dated Jun. 4, 2014 issued on PCT Patent Application No. PCT/CN2014/072538 dated Feb. 26, 2014, State Intellectual Property Office, P.R. China.

*Primary Examiner* — Cheikh Ndiaye
(74) *Attorney, Agent, or Firm* — Mannava & Kang, P.C.

(57) ABSTRACT

According to an example, a service coordination apparatus may include a processor that is to determine whether each GLB node-pair in a node-pair state table is at a normal state after receiving a DNS request. If a GLB node-pair in the node-pair state table is not at the normal state, a second DNS response may be sent to a node sending the DNS request according to a DNS parsing list. If each GLB node-pair in the node-pair state table is at the normal state, a proximity list may be inquired. If a record corresponding to the DNS request is searched out from the proximity list, a first DNS response may be sent to the node sending the DNS request according to the searched out record. If not, a second DNS response may be sent to the node sending the DNS request according to the DNS parsing list.

14 Claims, 2 Drawing Sheets

(51) Int. Cl.
  *H04L 29/12*   (2006.01)
  *H04L 29/08*   (2006.01)
  *H04L 29/14*   (2006.01)
  *H04L 12/751*  (2013.01)

(56) References Cited

U.S. PATENT DOCUMENTS

| | | | |
|---|---|---|---|
| 2008/0071925 A1* | 3/2008 | Leighton | H04L 29/12066 709/241 |
| 2010/0131639 A1* | 5/2010 | Narayana | H04L 67/1027 709/224 |
| 2011/0153723 A1* | 6/2011 | Mutnuru | H04L 29/12066 709/203 |
| 2011/0153840 A1* | 6/2011 | Narayana | H04L 67/1029 709/227 |
| 2011/0153938 A1* | 6/2011 | Verzunov | G06F 9/5083 711/118 |
| 2013/0097277 A1* | 4/2013 | Kim | H04L 47/00 709/217 |

* cited by examiner

SERVICE COORDINATION FOR A DATA CENTER

CLAIM FOR PRIORITY

The present application is a national stage filing under 35 U.S.C. §371 of PCT application number PCT/CN2014/072538, having an international filing date of Feb. 26, 2014, which claims priority to Chinese patent application number 201310063711.9, having a filing date of Feb. 28, 2013, the disclosures of which are hereby incorporated by reference in their entireties.

BACKGROUND

Companies are known to utilize multiple data centers instead of a single data center for their operations because service access interruption of a data center may occur due to network failures, hardware failures, or software failures. In addition, when a single data center is used, the speed of cross-regional access and access by cross-operators have been found to be relatively unsatisfactory. The utilization of multiple data centers has been found to increase the likelihood of rapid, sustained, and stable operation of key service systems.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

After multiple data centers are established, global load balancing (GLB) technologies are known to be widely used to coordinate the multiple data centers. The coordination of the multiple data centers may enable users to be provided with access to an optimal site, thus providing the users with preferential access experiences. In the GLB technologies, one service, e.g., a web service is released on the multiple data centers at the same time, and a GLB strategy is configured on GLB nodes. The GLB technology strategy generally enables an optimal site to be selected for a user's service access request, and thus the speed of cross-regional access or cross-operator access may be improved over operating the multiple data centers without the global load balancing technologies. In addition, by using the GLB technologies, the running state of each data center may be monitored in real time such that a failed data center or a failed server in a data center may be detected in real time and that service interruption may substantially be prevented. Further, user access experiences may be improved through use of the GLB technologies. For example, after requesting to access a home page of a web site and after a domain name system (DNS) procedure, the user may obtain an IP address that provides the best access experience from the GLB device. The best access experience may be defined as the access experience that includes the highest access speeds, the lowest latency, etc.

Currently, application modes supported by the GLB technologies include global DNS intelligent parsing, HTTP redirecting, etc. Scheduling policies supported by the GLB technologies include polling, weighted polling, priority in which a packet is always sent to a global server with highest priority, nearest scheduling, etc.

According to examples of the present disclosure, a service coordination method 100 (FIG. 1) and apparatus 200 (FIG. 2) may be provided for GLB devices. The service coordination apparatus 200 as disclosed herein may enable the GLB devices of multiple data centers to work together efficiently.

Figure 1:
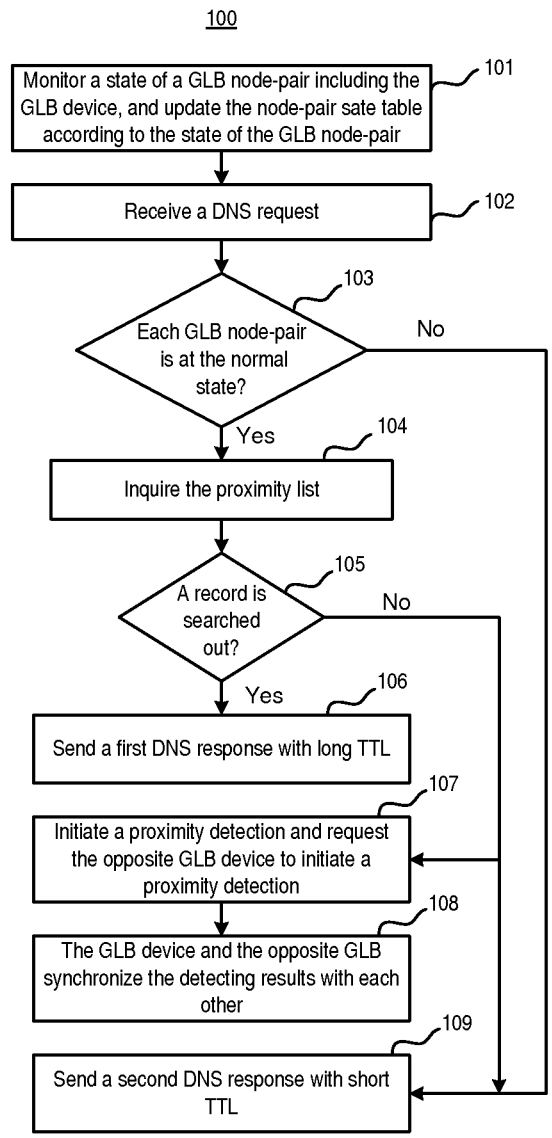
FIG. 1 is a schematic flowchart illustrating a method according to an example of the present disclosure.
Figure 2:
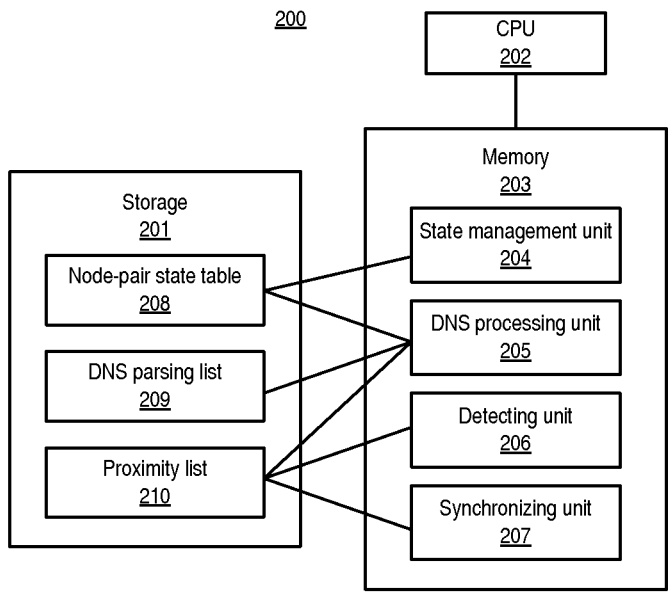
FIG. 2 is a schematic diagram illustrating a service coordination apparatus according to an example of the present disclosure.

Turning now to FIGS. 1 and 2, there are respectively depicted a flow diagram of a service coordination method 100 and a simplified block diagram of a service coordination apparatus 200, according to examples of the present disclosure. According to an example, the service coordination apparatus 200 may be implemented by a set of machine readable instructions, e.g., software, and may be applied to a GLB device. For instance, the service coordination apparatus 200 may be installed or otherwise be part of a GLB device. The hardware environment of the service coordination apparatus 200 may generally include a storage 201, a processor (or CPU) 202, and a memory 203. Although described separately herein, it should be understood that the storage 201 and the memory 203 may be the same component without departing from a scope of the method or apparatus disclosed herein. The storage 201 and the memory 203 may each be a non-transitory computer readable storage medium or the same non-transitory computer readable storage medium. In addition, the processor 202 may implement the apparatus by executing machine readable instructions in the memory 203.

As shown in FIG. 2, the memory 203 of the apparatus 200 may include a state management unit 204, a DNS processing unit 205, a detecting unit 206, and a synchronizing unit 207. The storage 201 of the apparatus 200 may include a node-pair state table 208, a DNS parsing list 209, and a proximity list 210. When the node-pair state table 208, the DNS parsing list 209, and the proximity list 210 occupy a relatively small amount of space, the storage 201 may be the same component as the memory 203, and when the node-pair state table 208, the DNS parsing list 209, and the proximity list 210 occupy a relatively large amount of space, the storage 201 may be a hard disk or a database.

With reference back to FIG. 1, at block 101, the state management unit 204 may monitor a state of a GLB node-pair including the GLB device, and may update the node-pair state table 208 according to the state of the GLB node-pair.

According to an example, each of the multiple data centers that are coordinated with each other may be regarded as one data center site. The number of data center sites may be the same as or different from the number of GLB devices. In addition, DNS parsing relationships may be configured in a DNS parsing list 209 of the GLB device. The DNS parsing relationship may include a relationship between IP addresses and domain names of services provided by a server in the data center site including the GLB device. The DNS parsing relationship may be reported by other devices in the data center site. For example, the DNS parsing relationship may be reported by a local loading balance (LB) device to the GLB device. According to various examples, the GLB device may obtain the DNS parsing relationships in advance. The other GLB device may be an opposite GLB device, e.g., in another data center site. According to an example, one GLB device and each opposite GLB device form one GLB node-pair, and the GLB device stores states of the GLB node-pairs.

According to an example, when the state management unit 204 monitors the state of the GLB node-pair including the GLB device, the following processing may be performed.

Figure 3:
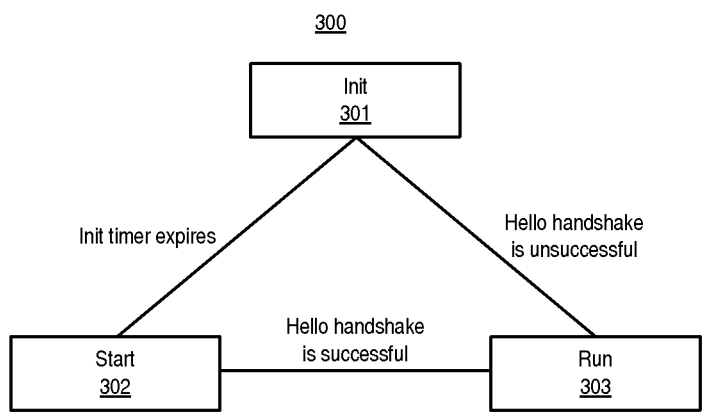
FIG. 3 is a schematic diagram illustrating node-pair states according to an example of the present disclosure.

For each GLB device, the states of all of the GLB node-pairs maintained by the state management unit 204 in the GLB device may be as shown in FIG. 3. Conditions between each state may be switched as depicted in Tables 1 to 3, which are depicted below. The definitions of each state may be as follows. Init 301 indicates an initial state, and the initial state may be switched to a start state after an initial timer expires. Start 302 indicates a start state, and a Hello packet may be sent to each opposite GLB device to implement a handshake. Run 303 indicates a normal state, which may be reached in response to the handshake being successful and data interaction may be performed between the GLB device and the opposite GLB device. The state management unit 204 may maintain the state of each GLB node-pair according to the information contained in Tables 1 to 3, and may update the node-pair state table 208 according to the state of each GLB node-pair.

TABLE 1

| original state | Event | Processing | Next state |
| --- | --- | --- | --- |
| Init | Receive a Hello packet | No processing is performed | Init |
| | Init timer expires, and enable global load | Start a hello timer | Start |
| | Enable a global load function | Record that the global load function is enabled, and start an Init timer | Init |
| | Disenable the global load function | Cancel an Init timer | Init |
| | global load function is not enabled | No processing is performed | Init |

TABLE 2

| original state | Event | Processing | Next state |
| --- | --- | --- | --- |
| Start | Receive a Hello packet | Notify the global loading node to switch to the Run state, Hello counter is cleared | Run |
| | The Hello timer expires | a Hello packet is sent, a Hello counter is incremented | Start |
| | Disenable the global load function | Hello counter is cleared, the Hello timer is cancelled, the Init state is switched to | Init |

TABLE 3

| original state | event | Processing | Next state |
| --- | --- | --- | --- |
| Run | Receive a Hello packet | The Hello counter is cleared | Run |
| | The Hello timer expires, the Hello counter is less than 3 | a Hello packet is sent, a Hello counter is incremented | Run |

TABLE 3-continued

| original state | event | Processing | Next state |
| --- | --- | --- | --- |
| | The Hello timer expires, the Hello counter is not less than 3 | Notify the global loading node to switch to the Init state,, the Hello counter is cleared, and Init timer is started | Init |
| | Disenable the global load function | The Hello counter is cleared, the Hello timer is cancelled, the Init state is switched to | Init |

According to an example, records in the node-pair state table 208 may be updated according to DNS processing procedures.

At block 102, a DNS request may be received. In addition, at block 103, after a DNS request is received, the DNS processing unit 205 may determine whether each GLB node-pair in the node-pair state table 208 is at a normal state (or run state 303). If each GLB node-pair in the node-pair state table 208 is at the normal state 303, the proximity list 210 may be inquired as indicated at block 104. However, if at least one GLB node-pair in the node-pair state table 208 is not at the normal state 303, a second DNS response with a short time to live (TTL) may be sent as indicated at block 109.

According to an example, after the DNS request is received by the DNS processing unit 205, if each GLB node-pair in the node-pair state table 208 is at the normal state 303, i.e., the run state, the synchronizing unit 207 may synchronize the DNS parsing list 209 to GLB devices in other data center sites and may receive DNS parsing lists synchronized by the GLB devices in other data center sites. After the synchronization is finished, the GLB device may obtain the DNS parsing list of each data center site in the coordinated data centers, that is, the GLB device may determine all of the services provided by each server in the coordinated data centers, and IP addresses corresponding to each domain name. One certain domain name, e.g., www.abc.com may correspond to multiple server IP addresses, e.g., 1.1.1.1 and 2.2.2.2, and different users may obtain the best, e.g., optimized, access experience of the domain name from one of the different server IP addresses. According to an example, the GLB device may determine the best server IP address for the user according to the information contained in the proximity list 210. The best access experience may be defined as the user experience that includes that highest access speeds, the lowest latency, etc.

According to an example, the DNS processing unit 205 belongs to a GLB device 1. In this example, when there is at least one GLB node-pair in the node-pair state table 208 stored by the GLB device 1 that is not at the normal state 303, an indication may be made that a handshake between the GLB device 1 and another GLB device, e.g., a GLB device 2, is not successful. Prior to a successful handshake, the GLB device 1 may not synchronize the DNS parsing relationships in the DNS parsing list 209 to the GLB device 2 and may not receive DNS parsing relationships synchronized by the GLB device 2, and thus GLB device 1 may not know the services provided by servers in a data center site including the GLB device 2.

For example in which there is a domain name of www.abc.com, a server in the data center site including the GLB device 2 may provide an access service for the domain name, and a server IP address of the server, e.g., 2.2.2.2, corresponds to the domain name of www.abc.com. In the data center site including the GLB device 1, a server may also provide an access service for the domain name of www.abc.com, and a server IP address of the server is 1.1.1.1.

In this example, the user may access www.abc.com by accessing one of the IP addresses 1.1.1.1 or 2.2.2.2. The GLB device 1 may notify the user of the IP address corresponding to www.abc.com in the DNS parsing procedure. For the user, the experiences of accessing the server IP addresses 1.1.1.1 and 2.2.2.2 may be very different. When the GLB device 1 does not obtain the DNS parsing list synchronized by the GLB device 2, the GLB device 1 may not determine whether the IP address 1.1.1.1 is the best DNS parsing result of the domain name www.abc.com for the user. According to an example, processing at block 109 may be performed directly, and a temporary DNS parsing result may be provided for the user.

At block 104, the DNS processing unit 205 may inquire, e.g., search, the proximity list 210. In addition, at block 105, a determination may be made as to whether a record corresponding to the DNS request is searched out, e.g., identified, from the proximity list 210. If a record corresponding to the DNS request is searched out from the proximity list 210, block 106 may be performed. If no record corresponding to the DNS request is searched out from the proximity list, blocks 107 and 109 may be performed.

After the DNS request is received by the DNS processing unit 205, if each GLB node-pair in the node-pair state table 208 is at the normal state 303, the synchronizing unit 207 may synchronize the DNS parsing list 209 to the GLB devices in other data center sites. After the synchronization is finished, the GLB device may start a normal processing procedure. At this time, the GLB device may obtain the DNS parsing list of each data center site in the coordinated data centers, that is, the GLB device may determine all of the services provided by each server in the coordinated data centers, and IP addresses corresponding to each domain name. One certain domain name, e.g., www.abc.com, may correspond to multiple server IP addresses, e.g., 1.1.1.1 and 2.2.2.2, and different users may obtain the best access experience of the domain name from one of the different server IP addresses. According to an example, the GLB device may determine the best server IP address for the user according to information contained in the proximity list 210.

At block 106, the DNS processing unit 205 may send a first DNS response to a node sending the DNS request according to the searched out, e.g., identified, record. When the state of each GLB device node-pair stored by the GLB device is normal 303, the DNS processing unit 205 may inquire the proximity list according to the DNS request. Because the GLB device obtains the DNS parsing list of each data center site in the coordinated data centers, the GLB device may determine each service provided by each server. The DNS processing unit 205 may determine a best server IP address for the user according to information contained in the proximity list 210, and may send the first DNS response to the node that sent the DNS request according to the searched out record.

At block 109, the DNS processing unit 205 may send a second DNS response to the node that sent the DNS request according to information contained in the stored DNS parsing list 209. The time to live (TTL) carried by the second DNS response at block 109 may be shorter than the TTL carried by the first DNS response at block 106.

According to an example, the GLB node-pair may be not at the normal state 303 at block 103. If at least one of the GLB node-pairs is not at the normal state 303, an indication may be made that the GLB device has not determined the services provided by the coordinated data centers, and thus the second DNS response carrying the short TTL may be returned. According to an example, the value of the TTL may be 1 minute. In addition, the value of the TTL may indicate the life time of the DNS parsing result.

For example in which, when a user A accesses the domain name www.abc.com, the best server IP address is 2.2.2.2. Since the DNS parsing list 209 in the GLB device 1 does not include the relationship between the domain name www.abc.com and the IP address of 2.2.2.2, the GLB device 1 may return the IP address of 1.1.1.1 via the DNS response. Since the IP address of 1.1.1.1 may not provide the best user access experience, for the purpose of improving the user experience, the TTL carried by the DNS response may be configured with a relatively small value, so that the DNS parsing result of "2.2.2.2" obtained by the user is a "short-lived" or "temporary" result and may expire in a relatively short period of time. After the DNS parsing result expires, the user may send a DNS request again to obtain a new DNS parsing result.

It should be noted that the GLB device may be at the abnormal state for a relatively long time. As such, the user may continually send the DNS requests and the GLB device may continually send the "temporary" DNS responses, which may consume a relatively large amount of calculating resources of the GLB device. In order to limit this occurrence and according to an example, the GLB device may determine whether the temporary DNS response reaches a preset threshold. The preset threshold may be a time threshold or a threshold corresponding to the number of times that the temporary DNS responses are sent. If the temporary DNS response reaches the preset threshold, the GLB device may lengthen the TTL of a subsequent DNS response, so as to avoid the sending of continual DNS requests. According to an example, the lengthened TTL may be identical to the TTL carried in the first DNS response.

In addition, when the GLB device is initially started, the proximity list may be null, and thus no record may be searched out at block 105. For example, when the user of IP address 3.3.3.3 accesses the domain name www.abc.com for the first time, the DNS processing unit 205 may not search out any record. In this case, the DNS processing unit 205 may obtain an IP address from the DNS parsing list 209, e.g., 1.1.1.1, and may send the obtained IP address to the user that sent the DNS request. As the IP address 1.1.1.1 may be not provide the best user access experience, the TTL carried by the DNS response may be short.

The above descriptions relate to a temporary processing mechanism performed by the GLB device when at least one GLB node-pair is not at the normal state or when no record is searched out.

At block 107, when the record corresponding to the DNS request is not searched out at block 105, the detecting unit 206 may send a detecting instruction to the opposite GLB device to request the opposite GLB device to initiate proximity detection for the node that sent the DNS request. The detecting unit 206 may also initiate the proximity detection for the node that sent the DNS request and may store a detection result in the proximity list.

According to an example, when the DNS processing unit 205 does not search out the record corresponding to the DNS request, the DNS processing unit 205 may immediately notify the detecting unit 206 to initiate the proximity detection for the node that sent the DNS request, and may store the detection result in the proximity list 210.

According to an example, the detecting unit 206 sends an assistance detecting instruction to each opposite GLB device, and requests detecting units of all of the opposite devices to initiate the proximity detection.

Generally, the communication quality between the user and the GLB device may reflect the experience of accessing the server in the data center site. According to an example, the GLB device may initiate the proximity detection through use of various techniques, e.g., sending a detection packet to the IP address of the user or performing other indirect detecting processing. The detection result may be key parameters, e.g., a response delay. In Tables 4 and 5 below, proximity lists of the GLB devices 1 and 2 are respectively shown.

TABLE 4

| sequence number | Domain name | Server IP address | User IP address | Access delay |
|---|---|---|---|---|
| 1 | www.abc.com | 1.1.1.1 | 3.3.3.3 | 0.5 ms |
| ... | ... | ... | ... | ... |

TABLE 5

| sequence number | Domain name | Server IP address | User IP address | Access delay |
|---|---|---|---|---|
| 1 | www.abc.com | 2.2.2.2 | 3.3.3.3 | 0.1 ms |
| ... | ... | ... | ... | ... |

After finishing the proximity detection, the GLB device may store the current detecting result in the proximity list 210.

At block 108, the synchronizing unit 207 may send the current detection result to the opposite GLB device, compare a detection result returned by the opposite GLB device with the current detection result in the proximity list 210, and store a best detection result in the proximity list 210.

After finishing the proximity detection, via the synchronizing unit 207, the GLB device may send the current detection result to the opposite device, compare the detection result returned by the opposite GLB device with the current detection result in the proximity list, and store the best detection result in the proximity list 210. For example, as shown in Tables 4 and 5, the GLB device 1 receives the detection result from the GLB device 2. Because the access delay of the server IP address 2.2.2.2 is shorter, the best server IP address is 2.2.2.2 for the user of IP address 3.3.3.3. The synchronizing unit 207 of the GLB device 1 may remove the record in the table 4, modify the service IP address as 2.2.2.2, and modify the access delay as 0.1 ms.

According to an example, the synchronizing unit 207 may regularly synchronize detection results stored in the proximity list 210 of the GLB device to the opposite GLB device in batch, and may send an acknowledgement message to the opposite GLB device after receiving detection results synchronized by the opposite GLB device in batch.

According to an example, the current detection result may be synchronized to the opposite GLB device through use of a no acknowledgement mode. In this mode, after the synchronizing unit 207 synchronizes the current detection result, the opposite GLB device may not need to send an acknowledgement message, and the synchronizing unit 207 may not send the acknowledgement message to the opposite GLB device after receiving the detection result synchronized by the opposite GLB device, so as to balance reliability and performance.

For example in which the coordinated data centers have 4 GLB devices, in order to synchronize the detecting result of one IP address, 4×3 packets may need to be transmitted between the GLB devices. If hundreds of user IP addresses need to be detected in a relatively short length of time, the number of packets transmitted between the GLB devices may be relatively large. If acknowledgement messages also need to be sent after each detection result is received, the number of the transmitted packets will be doubled, and will instantly impact the performance of networks and the GLB devices. Therefore, according to an example, when a single detection result is synchronized, no acknowledgement message may be needed. According to an example, the acknowledgement message may be sent for some data needing to be synchronized only once or some data that change seldomly. For example, the DNS parsing list preconfigured in each GLB device generally changes seldomly, and the acknowledgement message may be sent when synchronizing the preconfigured DNS parsing list.

According to an example, because the packet carrying the detection result may be lost in the procedure of transmitting the packet, the synchronizing unit 207 may regularly synchronize the detection results in the proximity list 210 in batch. For example, the proximity list 210 may be synchronized at each preset time interval or in an idle time period, e.g., early in the morning. In this way, more detection results may be carried by the synchronizing packet, and synchronizing efficiency may be improved. According to an example, the synchronizing unit 207 may request the opposite GLB device to send the acknowledgement message when synchronizing the detection results in batch. For example, when the proximity list is synchronized early in the morning, because the data center is idle, the performance of the GLB device and the network condition is sufficient to allow communication of a greater number of packets.

After the detecting and the single synchronizing are completed, the records in the proximity list 210 may be updated. When the user initiates the DNS request again, or another user initiates a DNS request for the same domain name, the DNS processing unit 205 may search out the record and may send a normal DNS response. The TTL carried by the normal DNS response may be longer than the TTL carried by the second DNS response. Generally, the value of the TTL carried by the normal DNS response may be one or more magnitudes larger than the TTL carried by the second DNS response.

By using the service coordination method and apparatus of GLB devices provided by the examples of the present disclosure, before the GLB node-pairs of the coordinated data centers are ready, temporary processing may be performed through implementation of the DNS procedure, so as to avoid problems caused by uncertain DNS parsing results.

It should be noted that the "user" described above may be defined for the DNS processing procedure of the GLB device. The user may be merely a node sending the DNS request. In various examples, the user may be a DNS server of a certain operator. Since the DNS processing procedure may be performed in different levels, the concept of the "user" may indicate a direction of the service processing rather than a main body perform the accessing.

The methods, modules, and devices described herein may be implemented by hardware, machine-readable instructions, or a combination of hardware and machine-readable instructions. Machine-readable instructions used in the examples disclosed herein may be stored in storage medium readable by multiple processors, such as hard drive, CD-ROM, DVD, compact disk, floppy disk, magnetic tape drive, RAM, ROM or other non-transitory storage device. Or, at least part of the machine-readable instructions may be substituted by specific-purpose hardware, such as custom integrated circuits, gate array, FPGA, PLD and specific-purpose computers and so on.

Specifically, a system or apparatus having a storage medium that stores machine-readable program codes or instructions for implementing functions of any of the above examples and that may make the system or the apparatus (or CPU or MPU) read and execute the program codes stored in the storage medium. In this example, the program codes or instructions read from the storage medium may implement any one of the above examples.

The storage medium for providing the program codes or instructions may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code or instructions may be downloaded from a server computer via a communication network.

It should be noted that, alternatively to the program codes being executed by a computer, at least part of the operations performed by the program codes may be implemented by an operation system running in a computer following instructions based on the program codes.

In addition, the program codes implemented from a storage medium may be written in a storage in an extension board inserted in the computer or in a storage in an extension unit connected to the computer. In this example, a CPU in the extension board or the extension unit may execute at least part of the operations according to the instructions based on the program codes.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A service coordination apparatus for a data center, said apparatus comprising:
   a processor; and
   a storage that is to store a node-pair state table, a domain name system (DNS) parsing list, and a proximity list;
   wherein the processor is to:
      determine whether each global load balancing (GLB) node-pair in the node-pair state table is at a normal state after receiving a DNS request;
      in response to at least one GLB node-pair in the node-pair state table not being at the normal state, send a second DNS response to a node that sent the DNS request according to the DNS parsing list;
      in response to each GLB node-pair in the node-pair state table being at the normal state, inquire the proximity list;
      in response to a record corresponding to the DNS request being searched out from the proximity list, send a first DNS response to the node that sent the DNS request according to the searched out record; and
      in response to no record corresponding to the DNS request being searched out from the proximity list, send a second DNS response to the node that sent the DNS request according to the DNS parsing list.

2. The service coordination apparatus of claim 1, wherein the processor is further to:
   monitor a state of a GLB node-pair comprising a pair of GLB devices; and
   update the node-pair state table according to the state of the GLB node-pair.

3. The service coordination apparatus of claim 1, wherein the second DNS response carries a time to live (TTL) value and wherein the TTL value is smaller than a preset value.

4. The service coordination apparatus of claim 1, wherein the processor is further to:
   in response to no record corresponding to the DNS request being searched out from the proximity list, send a detection instruction to an opposite GLB device in the GLB node-pair having the GLB device to request the opposite GLB device to initiate a proximity detection for the node that send the DNS request;
   initiate a proximity detection for the node that sent the DNS request, and store a current detection result in the proximity list;
   synchronize the current detection result to the opposite GLB device;
   compare the current detection result with a detection result returned by the opposite GLB device; and
   store one of the current detection result and the detection result returned by the opposite GLB device in the proximity list.

5. The service coordination apparatus of claim 4, wherein the current detection result is synchronized to the opposite GLB device through use of a no acknowledgement mode.

6. The service coordination apparatus of claim 4, wherein the processor is further to regularly synchronize detection results stored in the proximity list to the opposite GLB device in batch, and send an acknowledgement message to the opposite GLB device after receipt of the detection results synchronized by the opposite GLB device in batch.

7. The service coordination apparatus of claim 1, wherein the machine readable instructions are further to cause the processor to synchronize a DNS parsing relationship in the DNS parsing list to the opposite GLB device, and store a DNS parsing relationship synchronized by the opposite GLB device in the DNS parsing list.

8. A service coordination method for a data center, said method comprising:
   determining, by a processor, whether each global load balancing (GLB) node-pair in a node-pair state table is at a normal state after receiving a DNS request;
   in response to at least one GLB node-pair in the node-pair state table not being at the normal state, sending a second DNS response to a node that sent the DNS request according to a domain name system (DNS) parsing list;
   in response to each GLB node-pair in the node-pair state table being at the normal state, inquiring a proximity list;
   in response to a record corresponding to the DNS request being searched out from the proximity list, sending a first DNS response to the node that sent the DNS request according to the searched out record; and
   in response to no record corresponding to the DNS request being searched out from the proximity list, sending a second DNS response to the node that sent the DNS request according to the DNS parsing list.

9. The service coordination method of claim 8, further comprising:
   monitoring a state of the GLB node-pair comprising a pair of GLB devices; and
   updating the node-pair state table according to the state of the GLB node-pair.

10. The service coordination method of claim 8, wherein the second DNS carries a time to live (TTL) value and wherein the TTL value is smaller than a preset value.

11. The service coordination method of claim 8, further comprising:
   in response to no record corresponding to the DNS request being searched out from the proximity list,
      sending a detecting instruction to an opposite GLB device comprised in the GLB node-pair having the GLB device to request the opposite GLB device to initiate a proximity detection for the node that sent the DNS request;
   initiating a proximity detection for the node that sent the DNS request, and storing a current detection result in the proximity list;
   synchronizing the current detection result to the opposite GLB device;
   comparing the current detection result with a detection result returned by the opposite GLB device; and storing a best detection result in the proximity list.

12. The service coordination method of claim 11, further comprising using a no acknowledgement mode to synchronize the current detection result to the opposite GLB device.

13. The service coordination method of claim 11, further comprising:
   regularly synchronizing detection results stored in the proximity list to the opposite GLB device in batch, and sending an acknowledgement message to the opposite GLB device after receiving detection results synchronized by the opposite GLB device in batch.

14. The service coordination method of claim 8, further comprising:
   synchronizing a DNS parsing relationship in the DNS parsing list to the opposite GLB device, and storing a DNS parsing relationship synchronized by the opposite GLB device in the DNS parsing list.

\* \* \* \* \*